(12) United States Patent
Hoare et al.

(10) Patent No.: US 8,985,838 B2
(45) Date of Patent: Mar. 24, 2015

(54) STICK MIXER

(75) Inventors: Richard Hoare, Lane Cove (AU); Nicholas Roseby, Bondi (AU); Greg Upston, Ridgewood (AU)

(73) Assignee: Breville Pty Limited, Botany, New South Wales (AU)

( * ) Notice: Subject to any disclaimer, the term of this patent is extended or adjusted under 35 U.S.C. 154(b) by 0 days.

(21) Appl. No.: 13/634,875

(22) PCT Filed: Mar. 9, 2011

(86) PCT No.: PCT/AU2011/000262
§ 371 (c)(1),
(2), (4) Date: Sep. 21, 2012

(87) PCT Pub. No.: WO2011/113082
PCT Pub. Date: Sep. 22, 2011

(65) Prior Publication Data
US 2013/0003489 A1    Jan. 3, 2013

(30) Foreign Application Priority Data
Mar. 17, 2010    (AU) ................................ 2010901106

(51) Int. Cl.
*A47J 43/044*    (2006.01)
*A47J 43/07*    (2006.01)

(52) U.S. Cl.
CPC .......... *A47J 43/0711* (2013.01); *A47J 43/0705* (2013.01); *A47J 43/0727* (2013.01); *A47J 2043/04427* (2013.01); *A47J 2043/04436* (2013.01)
USPC ......................................................... 366/129

(58) Field of Classification Search
USPC ..................... 366/331, 344; 99/348
See application file for complete search history.

(56) References Cited

U.S. PATENT DOCUMENTS

| 4,893,760 | A | * | 1/1990 | Boin et al. | 241/282.2 |
| D345,076 | S | * | 3/1994 | Saltet | D7/376 |
| D348,587 | S | * | 7/1994 | Saltet | D7/376 |
| 2002/0034121 | A1 | * | 3/2002 | Rebordosa et al. | 366/129 |
| 2005/0078549 | A1 | * | 4/2005 | Hamelin | 366/129 |
| 2009/0303830 | A1 | * | 12/2009 | Wilson | 366/129 |

* cited by examiner

*Primary Examiner* — Charles Cooley
*Assistant Examiner* — Marc C Howell
(74) *Attorney, Agent, or Firm* — Molins & Co. Pty. Ltd

(57) ABSTRACT

A hand held stick mixer device has a motor housing, a stem and a blade housing. The blade housing has an interior sidewall below the floor having a distance across a transverse axis that is smaller than a distance across a perpendicular axis.

10 Claims, 6 Drawing Sheets

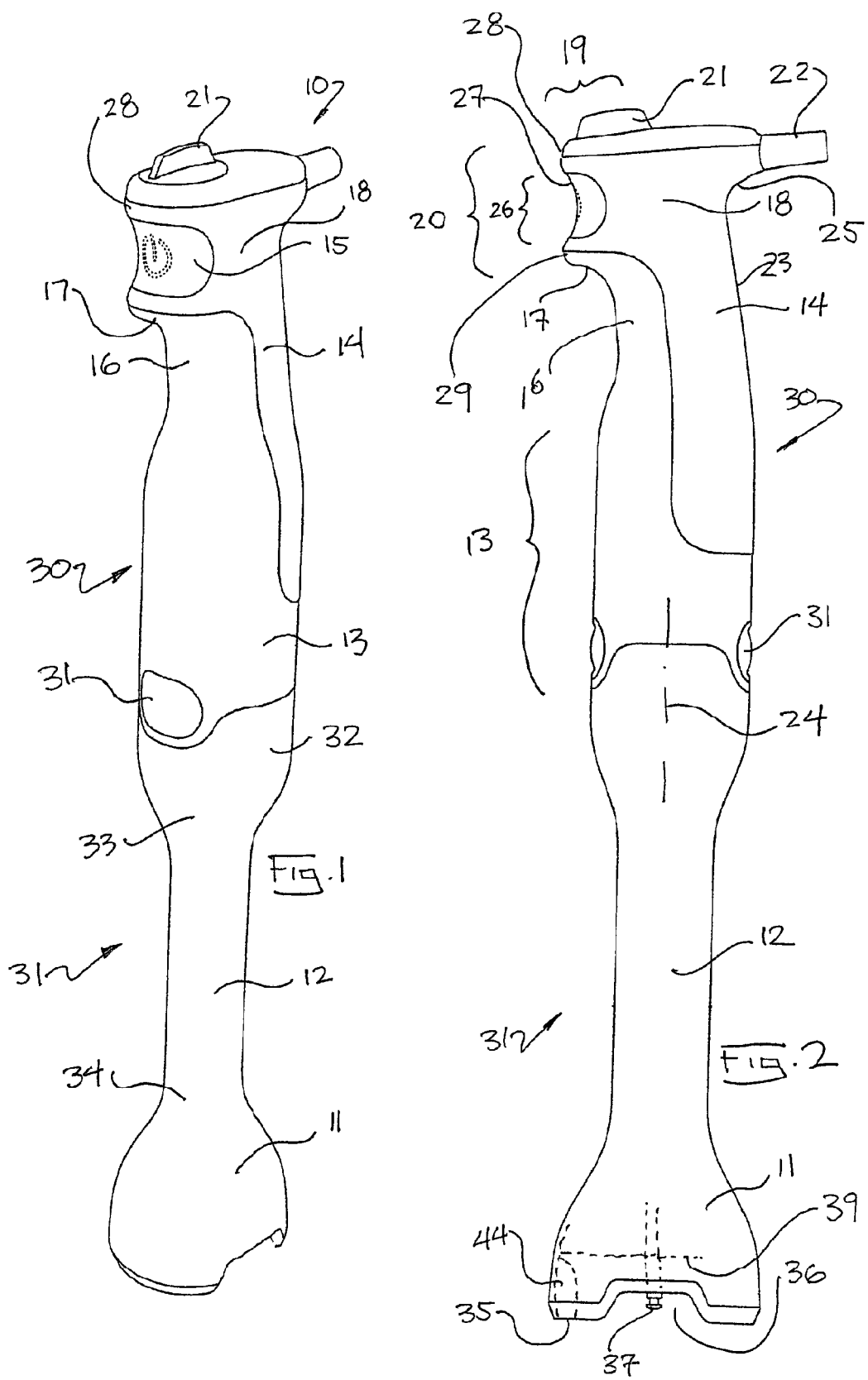

STICK MIXER

FIELD OF THE INVENTION

The invention relates to kitchen appliances and more particularly to a hand held electric mixer.

BACKGROUND OF THE INVENTION

Stick mixers are well known in domestic and commercial kitchens. Electric hand mixers have particular safety requirements and some of these are imposed by legislation. Hand mixers also have ergonomic requirements. The present invention seeks to address both the safety and ergonomic requirements of a stick type mixer.

The rotating blade of a stick mixer is contained within a bell housing. The rotational motion of the blade creates suction. If the suction is excessive, the mixer will draw itself against a flat surface such as the bottom of a container or bowl. When the bottom edge of the bell housing is urged excessively against a surface, the mixing efficiency is diminished and the user loses a certain degree of control over the motion of the mixer.

OBJECTS AND SUMMARY OF THE INVENTION

It is an object of the invention to provide a hand held stick type mixer that is comfortable to hold and that satisfies the appropriate safety requirements.

It is another object of the invention to provide a hand held stick type electric mixer that has a pistol like grip.

It is also an object of the invention to provide a hand held stick type mixer that has a blade housing with an interior sidewall below a floor, having a distance across a transverse axis that is smaller than a distance across a perpendicular axis. Void space in the housing may have ribs.

BRIEF DESCRIPTION OF THE DRAWING FIGURES

In order that the invention be better understood, reference is now made to the following drawing figures in which:

FIG. 1 is a perspective view of a stick mixer in accordance with the teachings of the present invention;

FIG. 2 is a side elevation of the stick mixer shown in FIG. 1;

Figure 7:
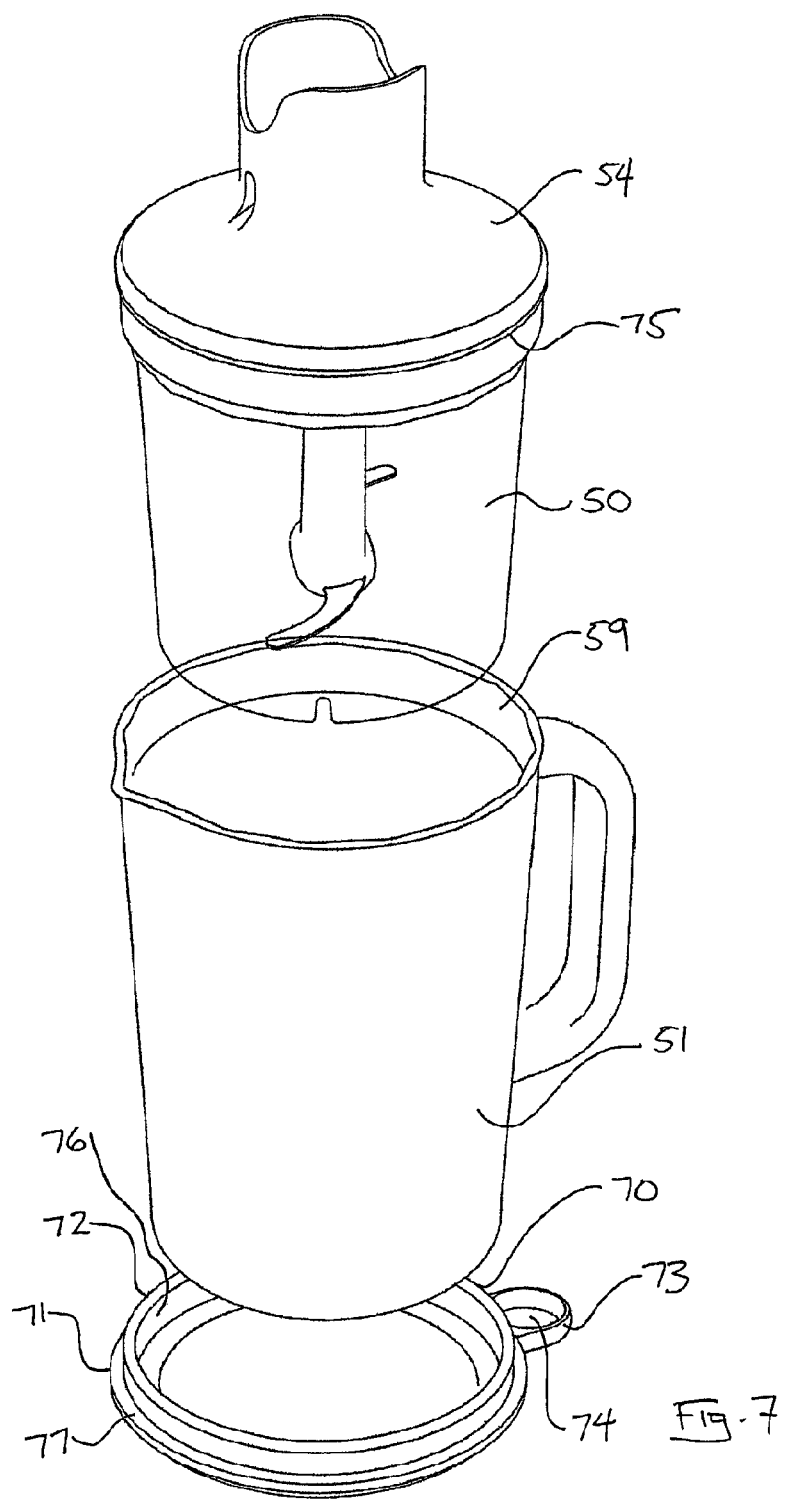
Figure 8:
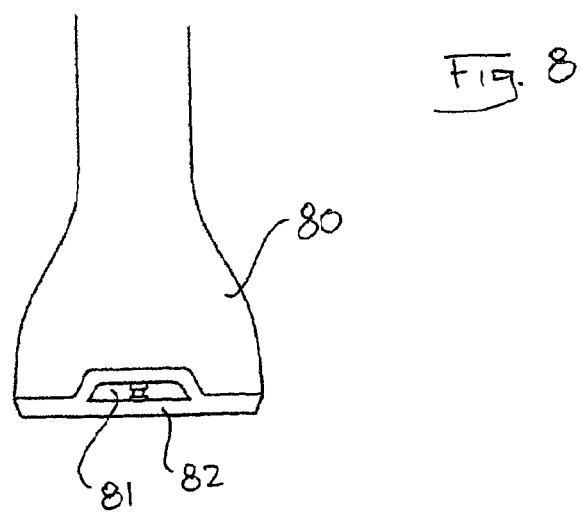

FIG. 7; is a perspective view of a mixing bowl, jug and combination base and lid;

FIG. 8 is a side elevation of a second embodiment of a bell housing; and

Figure 9:
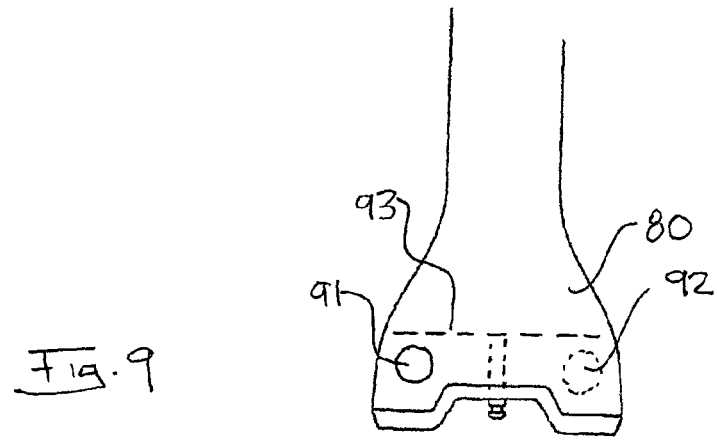

FIG. 9 is a third embodiment of a bell housing according to the teachings of the present invention.

BEST MODE AND OTHER EMBODIMENTS

As shown in FIG. 1, a hand held stick mixer 10 comprises a bell housing 11 for a rotating blade, a stem 12, a motor housing area 13 and a grip 14. As suggested in FIGS. 1 and 2, the hand held stick mixer of the present invention comprises a pistol-like grip 14. The grip is considered pistol-like because the mixer's on-off switch 15 protrudes away from the remainder of the grip area 16 and because the switch 15 is intended to be activated by the index finger. The remainder of the grip area 16 provides a convenient location for the middle finger, ring finger and pinky. The middle finger fits under a shelf 7 and a slight concavity 18 accommodates the thumb. The concavity 18 preferably extends to either side of the switch 15 resulting in an hourglass shape centred around the switch 15. The index finger protrusion or trigger protrusion 19 forms a head 20. The head is the uppermost part of the mixer and the uppermost part of the handle. The upper surface of the head comprises a rotating or other style speed adjustment or knob 21 and a flexible conduit for the electrical cord 22. The rear edge 23 of the grip and the areas adjacent to it comprise a palm contacting portion that is smooth and continuous from below the drip area to the transition 25.

As shown in FIG. 2, the rear surface 23 of the grip tapers toward the longitudinal centre line 24 and transitions smoothly 25 as it approaches the cord outlet 22. This provides a smooth and comfortable area to receive the web of skin that exists between the thumb and index finger of the user. With reference to the vertically orientated mixer shown in FIG. 2, a horizontal bands 26 located between the top and the bottom of the head 20 comprises a generally concave area comprising the aforementioned concavities 18 for receiving the thumb as well as a distinctly concave area 27 for receiving the index finger. In preferred embodiments, the concavity 27 further comprises an elastomeric membrane below which is located an electric switch that operates the motor. That switch operates in conjunction with the speed controller 21 to determiner the rotational speed of the blade (not shown) located within the bell housing. Particularly with reference to the areas above and below the switch and/or its protective membrane 27, the head comprises a pair of protective flanges 28, 29. With reference to the left side vertical elevation shown in FIG. 2, the protective flanges 28, 29 protrude past the switch and/or its protective membrane 27 and the switch and/or protective membrane extend past the grip area 16 intended to receive the middle, ring and pinky fingers. Thus the switch 15 is protected by the flanges 28 and 29 so that the switch can not be tripped with a 40 mm ball as known from safety standards. The lower area of the motor housing 13 also preferably protrudes beyond the portion of the grip 16 intended to receive the middle, ring and index fingers.

From a user's perspective, the stick mixer of the present invention comprises two major sub-assemblies. The upper assembly 30 includes the grip, the motor housing 13 and the user operable coupling components 31 that are used to removably attach the upper assembly from the lower assembly 31. The lower assembly comprises a coupling portion 32 that is generally round in cross section, a bell housing 11 that is generally oval in cross section and a stem 12 that is also generally oval in cross section and that interconnects the coupling portion 32 with the bell housing 11 using preferably smooth transitions 33, 34.

As shown in FIG. 2, the bell housing 11 preferably comprises a polymeric body having a stainless steel skin. The un-skinned lower (and preferably polymeric) edge 35 of the bell housing further comprises one or more relief areas 36 that interrupt the lowermost circumference of the bell housing 11. Also visible in FIG. 2 is the terminal end 37 of a rotating drive shaft that carries the mixer's blade (not shown).

Figure 3:
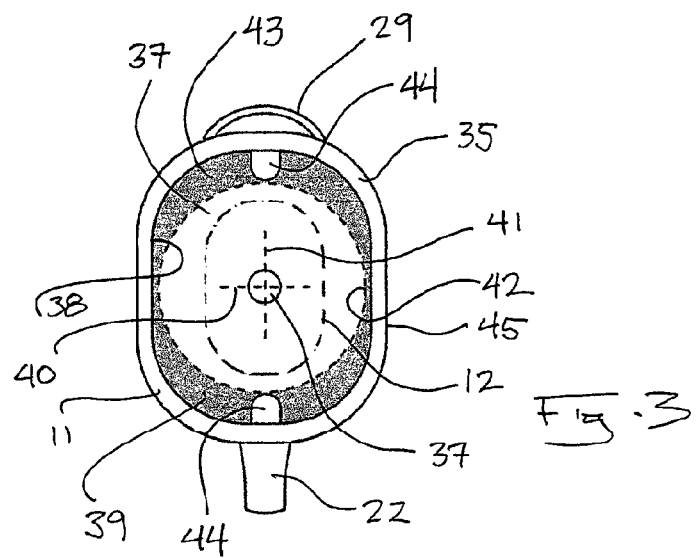
FIG. 3 is a bottom plan view of the mixer depicted in FIGS. 1 and 2.
Figure 4:
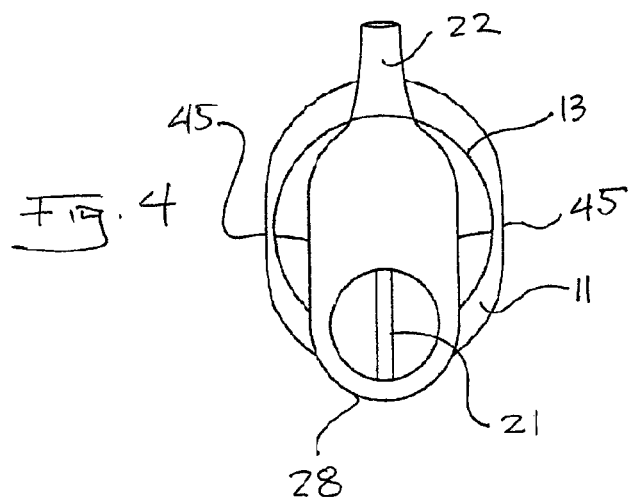
FIG. 4 is a top plan view of the mixer depicted in FIGS. 1 and 2.

As shown in FIG. 3, the bell housing 11 is generally oval in cross section. An oval, an oval with flat sides, or an ellipse shape may be used. The oval (or ellipse) cross section of the stem 12 and its concentric relationship to the cross section of the bell housing is demonstrated in this drawing figure. The rotating shaft 37 is central to both the stem 12 and the bell housing 11. FIG. 3 illustrates the lowermost edge or circumference 35 of the bell housing as well as the interior 37 of the bell housing 11. The interior comprises an interior side wall 38 defined by the interior side wall of the bell housing and its recess or recesses 36 and an optional interior floor 39 through which protrudes the shaft 37 (see FIG. 2). Because the bell housing interior sidewall 38 is oval (or ellipsoid) in cross section, the internal distance across the transverse axis 40 is smaller than the distance across a perpendicular axis 41. The interior of the bell housing, particularly at the level of the blade and below it (can be seen from FIG. 3) to resemble a symmetrically truncated circle or, for example, a rectangular middle part with or bounded by arcuate ends, those arcs approximating or being an arc of a circle. The ends may also alternately be semi-circular. The internal dimension along the transverse axis 40 is essentially determined by the diameter of the rotating blade and the required clearance for it. The internal dimension along the transverse axis 40 need only provide a blade clearance of a few millimeters. The rotating blade sweeps a circle with a diameter indicated by the dotted line 42 in FIG. 3. Any area in the horizontal plane that is not simply clearance for the rotating blade is indicated by the shading 43 and is referred to as void space. It will be observed that there is very little void space adjacent the transverse axis 40 and that there is more void space adjacent to the perpendicular axis 41. Thus, the amount of void space and its location within the bell housing corresponds generally to how the oval shape of the bell housing deviates form the circular swept path of the mixer's blade. The void space provides improved performance and room for the rib or ribs 44.

As shown in FIGS. 2 and 3, one or more ribs or turbulators 44 can be located within the bell housing 11. In these examples, the turbulators or ribs 44 are two in number and are located in alignment with the perpendicular axis 41. The ribs extend from close to the lower edge 35 to above the blade and toward the optional interior floor 39. The ribs only occupy the void space and do not interfere with the rotation of the blade. The ribs only need be thick enough to withstand the hydrodynamic forces within the interior of the bell housing without distorting. One, two or more ribs may be used. The ribs disrupt the swirling flow within the bell housing (particularly in the void space) and have been observed to reduce the suction generated by the rotating blade. This produces a more predictable feel for the user and reduces the extent to which the lower edge 35 of the bell housing can be adhered to a surface by virtue of the action of the rotating blade.

As shown in FIG. 3, an interior sidewall 38 is a peripheral sidewall that defines an elongate profile in horizontal cross section. This embodiment interior sidewall, in horizontal cross section, forms a pair of parallel straight side portions that each transition into arcuate end portions to adjoin respective ends of the parallel straight side portions. In this embodiment, the arcuate end portions are located about a perpendicular axis, and the side portions are parallel to the perpendicular axis.

Figure 5:
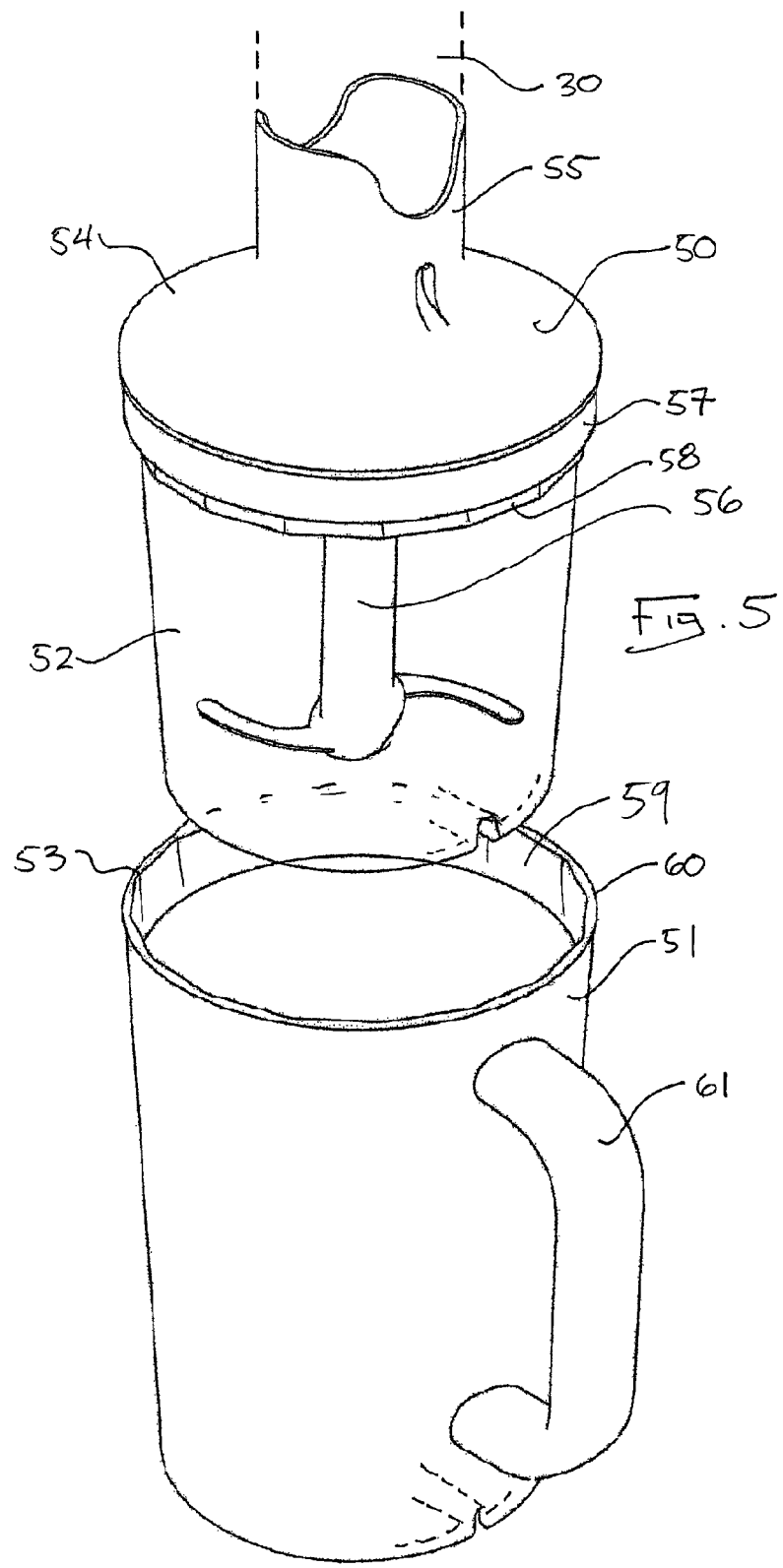
FIG. 5 is a perspective view of a mixing bowl and jug.
Figure 6:
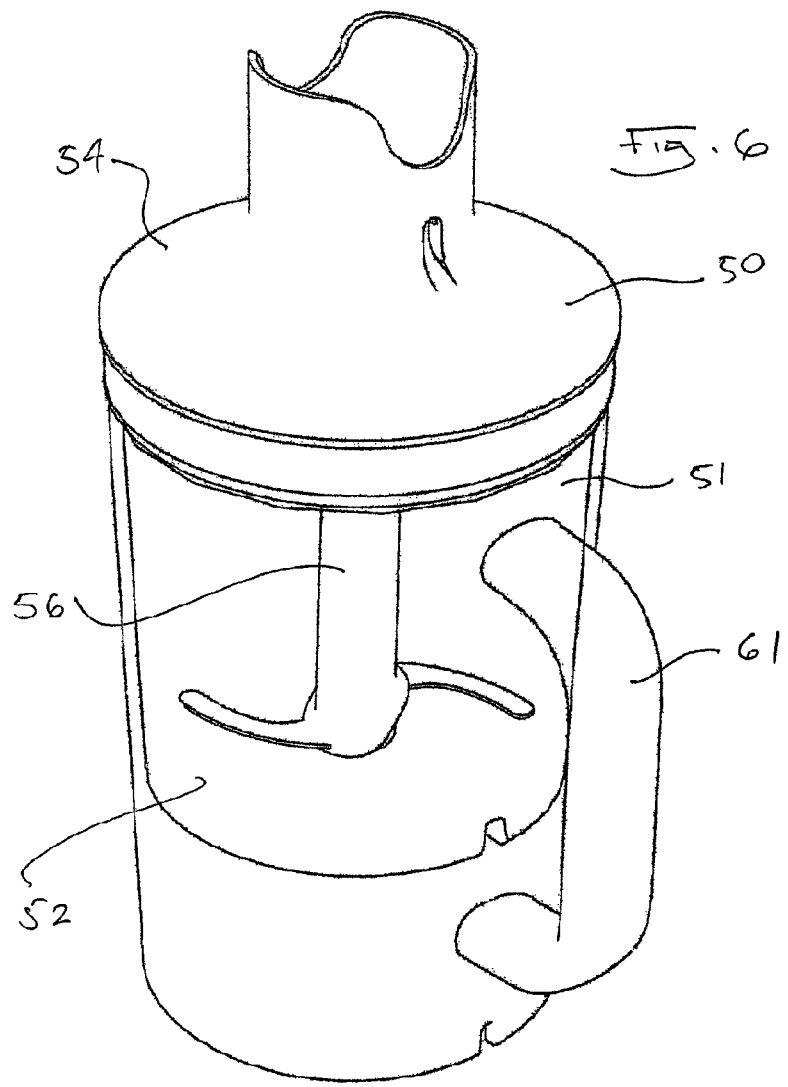
FIG. 6 is a perspective view of the mixing bowl and jug of FIG. 5 in an assembled configuration.

As shown in FIGS. 5 and 6, accessories for a stick mixer may include a co-operating chopper 50 and jug 51. The chopper 50 comprises a chopping vessel 52 that fits into and engages with the open mouth 53 of the jug 51. The chopping vessel 52 is generally cylindrical and preferably transparent. It has a lid 54. The lid 54 has an integral receptacle 55 for the upper assembly 30. The features of the receptacle 55 are intended to co-operate with the coupling features of the upper assembly 30. In this way, the output shaft of the upper assembly 30 can be used to drive a rotating chopper 56 that spins within the vessel 52. In this example, the rim area 57 of the vessel 52 is provided with an external, integral, polygonal, coupling ring 58. The integral coupling ring 58 engages a polygonal internal receiving ring 59 located around the interior of the mouth 60 of the jug 51.

In this example, the jug 51 is generally cylindrical, preferably transparent and has a grip or handle 61. The clearance between the coupling ring 58 and the receiving ring 59 is loose enough that the vessel 52 can be inserted and withdrawn easily. However, the clearance is close enough that the vessel 15 will not rotate with respect to the jug 51 once the coupling ring 58 and receiving ring 59 are engaged. The engaged configuration is shown in FIG. 6. The nesting between the jug and the vessel is useful for storing these accessories but also provides a convenient way of gripping the assembly of these two components for actual use in conjunction with the upper assembly of a stick mixer.

As shown in FIG. 7, a polymeric lid 70 is adapted to function as both a base and a lid for either or both of the chopper 50 or jug 51. The lid 70 comprises a top 71 and an upright internal rim 72. The lid also features a pull-tab 73 with a finger-sized opening 74. In preferred embodiments, the upright rim 72 fits snugly within the internal receiving ring or mouth 59 of the jug and also within the mouth 75 of the chopper or mixer 50 in the same way that it receives its lid 54. Because both the chopper 50 and the jug 51 are tapered (larger diameter at the top, smaller diameter at the bottom) the internal surface 76 of the rim 72 is adapted to receive the bottom of either or both of the jug 51 or chopper 50. The lid 70 also has a flange 77 that extends outwardly from the rim 72, the flange 77 acting to improve the seal when it is used as a lid and better cover the upper extremity of the vessel on which it is placed. The lid is preferably fabricated from a flexible, non-slip polymer.

Alternate embodiments of the bell housing 80 are depicted in FIGS. 8 and 9. FIG. 9 illustrates how a through opening 81 may be formed one or both sides of the oval shaped bell housing 80 by utilisation of a bridge 82 across the lower extent of one or both relief areas 36 (as shown in FIG. 2). The size or area of the opening 81 can be altered to suit the characteristics of the rotating blade, as required. Anther method of introducing openings into the interior of the bell housing is shown in FIG. 9. In this example, one or more through openings 91 are provided below the internal floor 93. In the example of FIG. 9, two openings 91, 92 are located in the housing 180 degrees or diametrically opposed from one another.

While the present invention has been disclosed with reference to particular details of construction, these should be understood as having been provided by way of example and not as limitations to the invention as it may be expressed in the claims.

What is claimed is:

1. A hand held stick mixer device having a motor housing, a stem and a blade housing, the blade housing comprising:
   a portion that extends from the stem within which is located a rotating blade;
   an interior floor through which protrudes a shaft for driving rotation of the blade;
   a downwardly directed interior sidewall extending below the interior floor; the interior sidewall having a distance across a transverse axis that is smaller than a distance across a perpendicular axis;
   the interior sidewall being a peripheral sidewall that defines an elongate profile in horizontal cross section; such that the interior sidewall, in horizontal cross section, forms a pair of parallel straight side portions that each transition into arcuate end portions to adjoin respective ends of the parallel straight side portions; the arcuate end portions being located about the perpendicular axis, and the side portions being parallel to the perpendicular axis;

wherein the blade is centrally located with respect to the interior sidewall and sweeps a circle in a horizontal plane, and any area in the horizontal plane within the interior sidewall that is not swept by the blade defines a void space; such that the void space about each side of the interior sidewall adjacent to the perpendicular axis is greater than the void space about the interior sidewall adjacent to the transverse axis; and each void space about the perpendicular axis has a vertically directed rib located on, and directed inwardly from, the arcuate end.

2. The device of claim 1, wherein:
the arcuate ends each approximate a circular arc.

3. The device of claim 1, wherein:
an internal dimension along the transverse axis is essentially determined by a diameter of the blade and a clearance for it.

4. The device of claim 1, wherein:
the one or more ribs extend from below the blade to above the blade.

5. The device of claim 1, wherein:
one or more relief areas interrupts a lowermost circumference of the blade housing.

6. The device of claim 1, wherein the bell housing comprises a polymeric body.

7. The device of claim 6, wherein the polymeric body has a stainless steel skin.

8. The device of claim 7, wherein the polymeric body defines an un-skinned lower edge of the bell housing.

9. The device of claim 8, wherein the un-skinned lower edge of the bell housing comprises one or more relief areas that interrupt the lowermost circumference of the bell housing.

10. The device of claim 1, wherein the interior sidewall, in horizontal cross section, forms a rectangular middle portion with arcuate end portions.

* * * * *